US00RE46081E

(19) United States
(12) Reissued Patent
Wang

(10) Patent Number: US RE46,081 E
(45) Date of Reissued Patent: Jul. 26, 2016

(54) SOLENOID GAS VALVE

(71) Applicant: Chia-Ping Wang, Mississauga (CA)

(72) Inventor: Chia-Ping Wang, Mississauga (CA)

(73) Assignee: Sprutan Group Ltd, Mississauga (CA)

(21) Appl. No.: 14/090,303

(22) Filed: Nov. 26, 2013

Related U.S. Patent Documents

Reissue of:

(64) Patent No.: 8,066,255
Issued: Nov. 29, 2011
Appl. No.: 09/911,721
Filed: Jul. 25, 2001

(51) Int. Cl.
*F16K 31/12* (2006.01)
*F16K 31/40* (2006.01)
*F02M 21/02* (2006.01)

(52) U.S. Cl.
CPC ..... *F16K 31/408* (2013.01); *F02M 21/0233* (2013.01); *F02M 21/0254* (2013.01); *F02M 21/0266* (2013.01); *F02M 21/0293* (2013.01); *Y02T 10/32* (2013.01)

(58) Field of Classification Search
USPC ..... 251/30.04, 30.03, 129.15
See application file for complete search history.

(56) References Cited

U.S. PATENT DOCUMENTS 2,832,200 A 4/1958 Grout et al.
3,270,626 A 9/1966 Bradbury (Continued)

*Primary Examiner* — Joseph Kaufman
(74) *Attorney, Agent, or Firm* — Dinsmore & Shohl LLP

(57) ABSTRACT

A solenoid valve has a main body defining a gas inlet passage, a gas outlet passage, and a cavity; a core tube forming a closure for [said] *the* cavity so as to prevent an escape of gas; a cylindrical main piston slidably movable in [said] *the* cavity of [said] *the* main body, [said] *the* main piston forming a front chamber and a back chamber in [said] *the* main body, [said] *the* main piston having a gas conduit for passing the gas from [said] *the* gas inlet passage to [said] *the* front chamber and an axial hole for passing the gas from [said] *the* back chamber into [said] *the* gas outlet passage with a bleed orifice at one end of [said] *the* axial hole; [said] *the* main piston being spring biased to a closed position; a spring biased pilot piston; and *an* electrical coil [means] associated with [said] *the* core tube to provide a magnetic field for movements of [said] *the* pilot piston and [said] *the* main piston, so that when [said] *the* coil [means] is deenergized [said] *the* pilot piston closes [said] *the* outlet passage and causes a pressure equalization allowing [said] *the* return spring to push [said] *the* main piston to close the valve, while when [said] *the* coil [means] is energized [said] *the* pilot valve opens [said] *the* outlet passage and lowers a pressure which causes pushing of [said] *the* main piston to open the valve.

10 Claims, 5 Drawing Sheets

(56) References Cited

U.S. PATENT DOCUMENTS

| | | | | |
|---|---|---|---|---|
| 3,273,468 | A | 9/1966 | Allen | |
| 3,312,445 | A | 4/1967 | Trombatore et al. | |
| 4,197,785 | A | 4/1980 | Weber | |
| 4,494,726 | A | 1/1985 | Kumar et al. | |
| 4,520,227 | A | 5/1985 | Krimmer et al. | |
| 4,699,351 | A | 10/1987 | Wells | |
| 4,799,645 | A * | 1/1989 | Kramer et al. | 251/30.04 |
| 5,188,017 | A | 2/1993 | Grant et al. | |
| 5,294,089 | A | 3/1994 | LaMarca | |
| 5,529,387 | A | 6/1996 | Mialkowski | |
| 5,538,026 | A * | 7/1996 | Kazi | 251/30.04 |
| 5,762,087 | A | 6/1998 | Khadim | |
| 6,315,266 | B1 | 11/2001 | Hirota et al. | |
| 6,435,210 | B1 * | 8/2002 | Obersteiner et al. | 251/30.03 |
| 6,443,420 | B1 * | 9/2002 | Hettinger | 251/30.04 |
| 6,540,204 | B1 | 4/2003 | Carter | |
| 6,994,308 | B1 | 2/2006 | Wang et al. | |
| 7,334,770 | B2 | 2/2008 | Wang et al. | |
| 7,341,236 | B2 * | 3/2008 | Stephenson et al. | 251/30.04 |
| 7,543,603 | B2 | 6/2009 | Wang et al. | |
| 8,066,255 | B2 | 11/2011 | Wang | |
| 8,172,197 | B2 * | 5/2012 | Gu et al. | 251/30.03 |

* cited by examiner

SOLENOID GAS VALVE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates generally to solenoid gas valves, and more particularly to a dual active pistons solenoid gas valve, in particular for alternative fuels vehicles.

In vehicles that run on gaseous alternative fuels, such as natural gas or hydrogen, the fuel is normally stored in a high-pressure tank, and a valve is utilized to open and close access to conduits, along which such high-pressure gaseous fluids flow from a storage tank to a vehicle engine. Typically such valves are of the solenoid type.

Solenoids of a reasonable size can typically produce a pulling force that is approximately only 1/100 of the force necessary to unseat a valve that is being forced shut by the high-pressure gasses. To overcome this, most of the gas valves adapt a two-stage process in which a small "bleed" orifice is first opened, allowing the high-pressure gas from the storage tank to flow through the "bleed" orifice and into a downstream outlet passage way that leads the engine. As the downstream outlet passage way fills up with gas, the pressure will increase, subsequently gradually reducing the force necessary to unseat the closed valve. Eventually, the differential pressure between the upstream and downstream passage ways becomes so small as to allow the valve to be open by the relatively weak pull of the solenoid valve, thus resulting in the flow of high-pressure gas from the storage tank to the vehicle engine.

One of the main problems with the above described system is the length of time required for the downstream chamber to fill with a sufficient volume of high-pressure gas, so that the solenoid can unseat the main valve. This problem is exasperated in large vehicles, such as buses where the gaseous fuel storage tank can be several meters away from the engine and therefore, it may take an unacceptable period of time for the passageway downstream of the valve to fill up to the point when the solenoid can unseat the main valve. These valves are also disadvantageous in vehicles that are bi-fueled by gasoline and natural gas or dual-fueled by diesel fuel and natural gas. When these vehicles switch over from liquid fuel to natural gas, there can be a conspicuous loss in power output over an unacceptable period of time, while the passage way downstream of the valve fills up with natural gas.

SUMMARY OF THE INVENTION

Accordingly, it is an object of the present invention to provide a solenoid gas valve of the above mentioned general type which avoids the disadvantages of the prior art.

It is also an object of the present invention to provide a solenoid gas valve which has an intrinsic ability to shut off gas flow when a battery voltage is diminishing, so that when the battery becomes weaker, the pull on the pilot piston will weaken accordingly allowing it to close, so as to provide equalization of pressures in two chambers and sealing of the main piston, to stop the flow of gaseous fuels to the engine when the battery expires and the vehicle stops running.

It is also another object of the present invention to provide a solenoid gas valve that will virtually open and close instantaneously, once the solenoid coil is energized, so that a very rapid and immediate opening of the valve to a wide-open position is performed.

It is also another object of the present invention to provide a solenoid gas valve in which there is no reliance on the built-up pressure within a downstream outlet passage way as a means for operating the valve, so that the inventive solenoid gas valve can operate soundly and rapidly independently from the pressure in the downstream outer passage way.

In keeping with these objects and with others which will become apparent hereinafter, one feature of present invention resides, briefly stated in a solenoid gas valve which has a main body defining a gas inlet passage, a gas outlet passage, and a cavity; a core tube forming a closure for said cavity so as to prevent an escape of gas; a cylindrical main piston slidably movable in said cavity of said main body, said main piston forming a front chamber and a back chamber in said main body, said main piston having a gas conduit for passing the gas from said gas inlet passage to said front chamber and an axial hole for passing the gas from said back chamber into said gas outlet passage with a bleed orifice at one end of said axial hole; said main piston being spring biased to a closed position; a spring biased pilot piston; and electrical coil means associated with said core tube to provide a magnetic field for movements of said pilot piston and said main piston, so that when said coil means is deenergized said pilot piston closes said outlet passage and causes a pressure equalization allowing said return piston to push said main piston to close the valve, while when said coil means is energized said pilot valve opens said outlet passage and lowers a pressure which causes pushing of said main piston to open the valve.

When the solenoid gas valve is designed in accordance with the present invention, it avoids the disadvantages of the prior art and provides for the above-specified advantages. The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

A rapid action solenoid gas valve in accordance with the present invention is illustrated in FIGS. 1-5. FIGS. 1 and 2 describe parts that make up the solenoid gas valve. A coil 1 and yoke 2 are mounted on a core assembly tube with a screw 3. The core assembly includes a stop 4, a tube 5 and the core, and the core includes a flange 6. A magnetic circuit is formed by a guide bushing 26 and a molded pilot piston 9, both being constructed from ferromagnetic material. The core-assembly, to which is secured the coil and yoke, is threaded into a housing 51 of a main body. An O-ring 7 is provided at the junction of the core-assembly and the main body 50. The main body 50 is connected to an inlet chamber 16, which fills a front chamber 25 with high-pressure gas via an orifice 28 connected to an opening 29 in a spacer 21. A drilled hole 23 connects the valve outlet to an opening leading to a downstream passageway 24.

Figure 1:
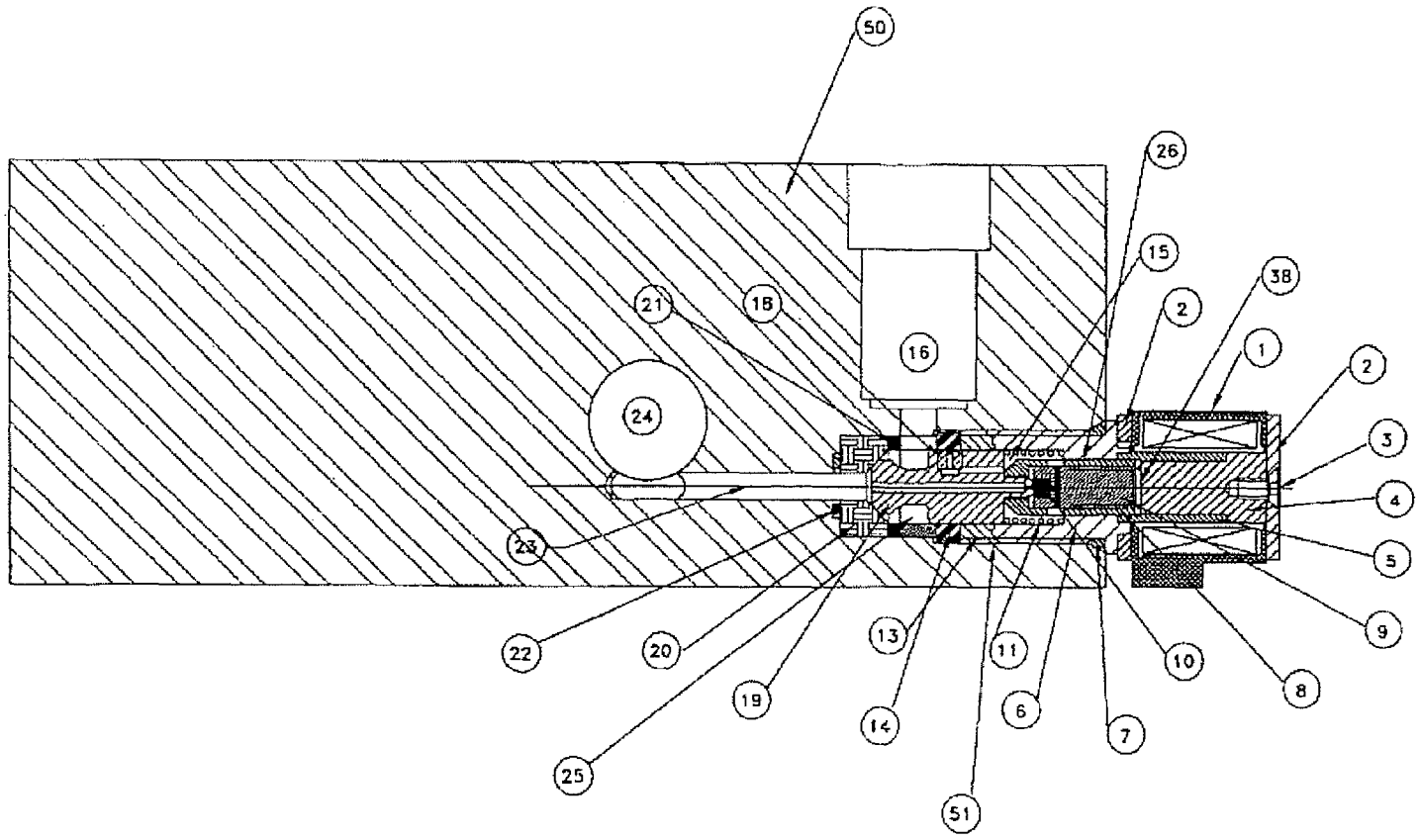
FIG. 1 is an axial sectional view through a valve in accordance with the present invention, in a closed condition.

A main piston 19 controls the main stream by sliding up and down within a rubber sleeve 13. The valve shuts off when the main piston 19 slides down pressing against a seal 20, and opens when the main piston 19 slides away from the seal 20. An O-ring 22 is provided underneath the seal in order to prevent gas leakage. A threaded nut 14 holds the spacer 21 and seal 20 in place. An insert 18 with an axial through-hole 30 is pressed into a cylindrical cavity 32 of the main piston 19 allowing high-pressure gas flows into the back chamber 15. An appropriate sealant is placed around an insert 18 to avoid gas leakage into the interstitial spaces between the main piston 19 and the front chamber 25. The core also presses the rubber sleeve 13 that prevents gas leakage into a back chamber 15 from surrounding space. High-pressure gas flows from the front chamber 25 to the back chamber 15 via a network of spaces, orifices and passageways (36, 30, 31, 32 and 33). The axial through-hole 30 limits the high-pressure gas flow when the valve is opened and that helps to create the pressure difference between the two chambers. An interference fit between the main piston 19 and the rubber sleeve 13 also prevents gas flow axially between the two chambers via the interstitial spaces between the main piston 19 and the rubber sleeve 13.

When the coil 1 is energized, the pilot piston 9 opens and high-pressure gas from the back chamber 15 bleeds out of the valve through another network of orifices and passageways (35, 27, 23, and 24). A drain orifice 35 and a passageway 27 are drilled into the main piston 19, and they lead to the valve outlet. A return spring 11 inside the core applies a force against the main piston 19 so that it closes tightly. Guide bushing 26 is made of ferromagnetic material and threaded with the main piston 19 to provide a pilot piston chamber 38 to guide the movement of the sliding pilot piston 9. Another hole 34 is provided to connect the back chamber 15 to the pilot piston chamber 38. One end of the pilot piston 9 is molded with sealing material 10. A pilot piston spring 8 attached to the stop 4 supplies the force necessary to keep the pilot piston 9 closed when the solenoid is inactive.

The solenoid valve in accordance with the present invention operates in the following manner.

Figure 2:
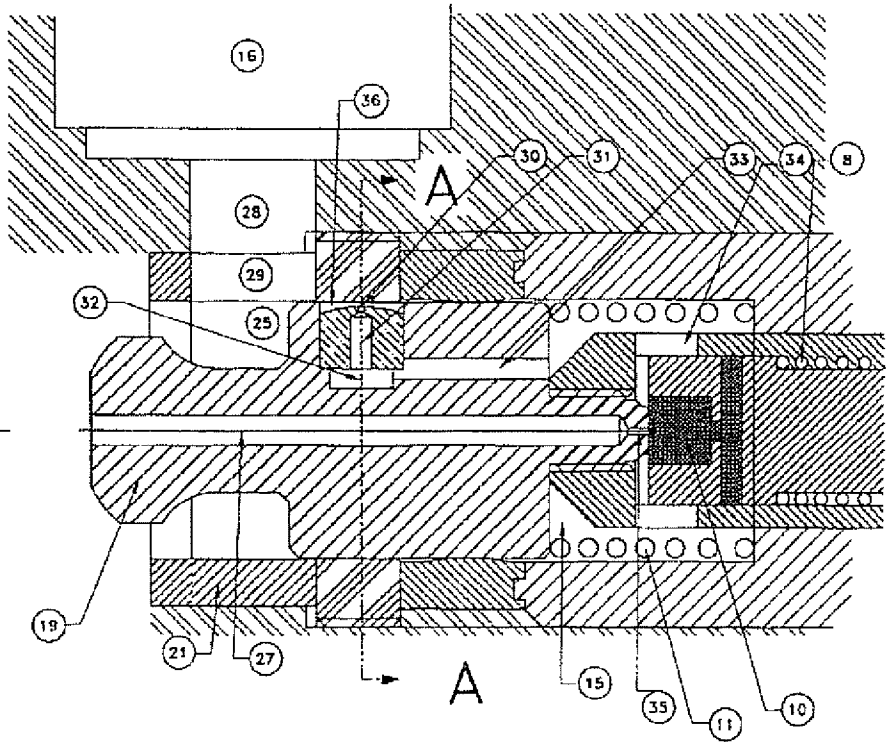
FIG. 2 is a partial axial sectional view of the valve of FIG. 1
Figure 2A:
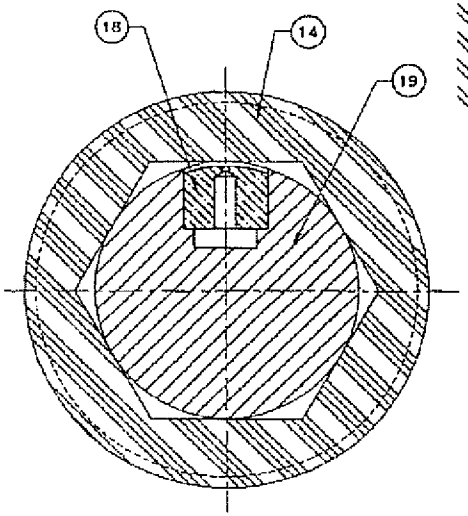
FIG. 2A is a view along A-A of FIG. 2.
Figure 3:
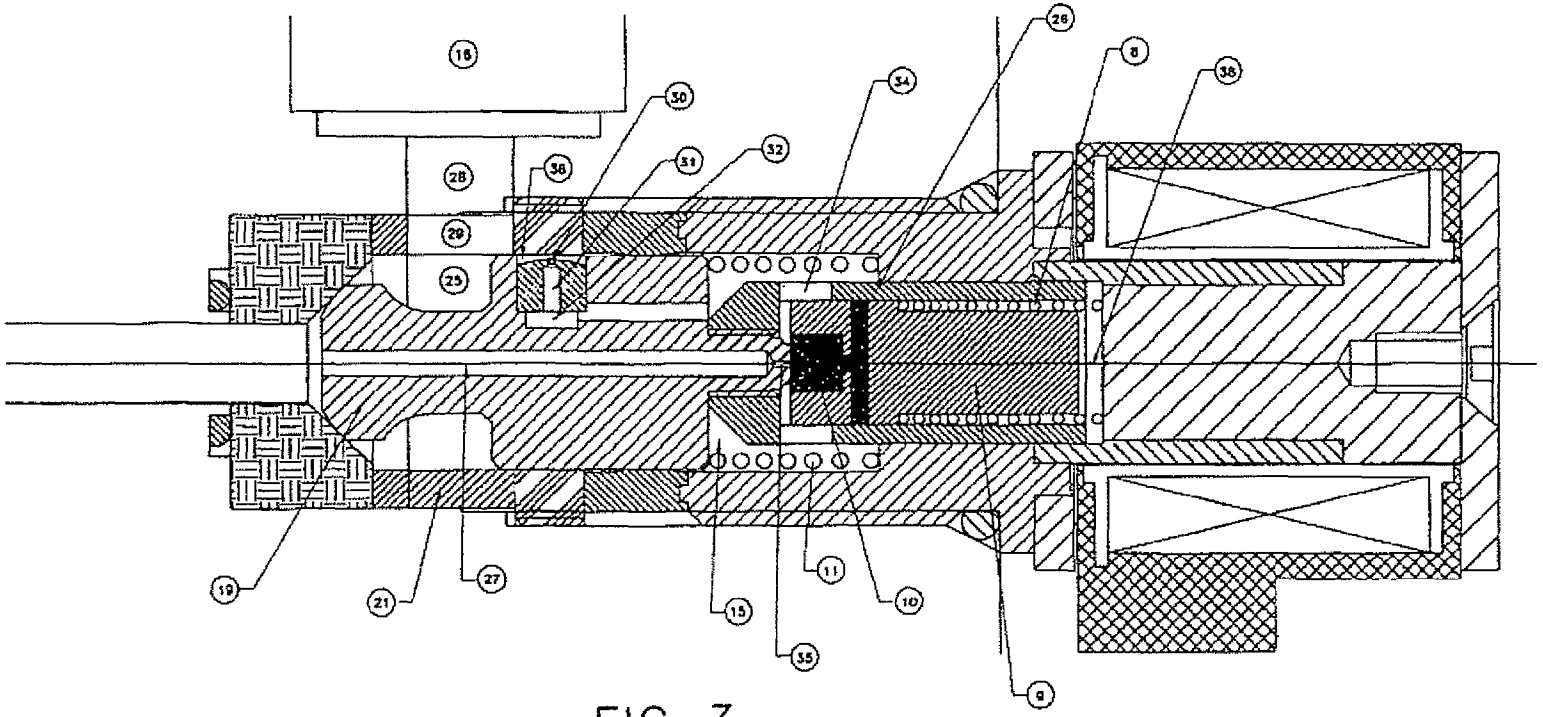
FIG. 3 is a view substantially similar to the view of FIG. 2, but showing the inventive valve when a solenoid coil is not energized.
Figure 4:
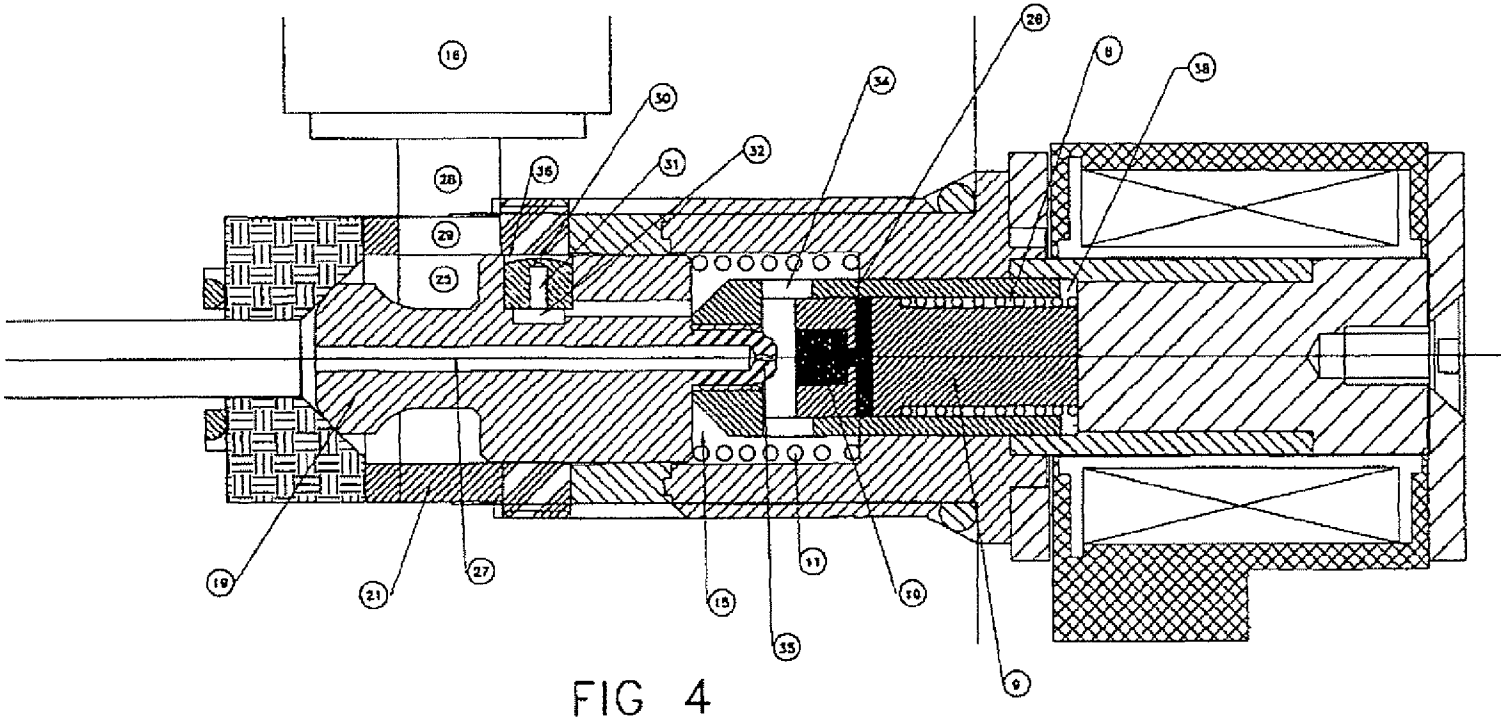
FIG. 4 is an axial sectional view of the inventive valve when solenoid coil has been energized.

FIG. 1 is an axial sectional view through a valve constructed in accordance with this invention. FIG. 1 shows the valve in the "closed" condition. In FIG. 2 the solenoid coil is not energized and the front chamber 25 fills up with high-pressure gas. At the same time, high-pressure gas flows into the back chamber 15 through the gap between the main piston 19 and the spacer 21 and then through a chamber 36 and an axial through-hole 30. The gas makes its way to the back chamber 15 through the series of orifices and passageways (31, 32 and 33). Hole 34 is provided so that the gas of the back chamber 15 flows into the pilot piston chamber 38. At this point, in FIG. 3, while the coil is not energized, the gas pressure on both sides of the main piston 19 is equal. In FIG. 4 the solenoid coil has been energized. The pilot piston 9 is attracted by the magnetic force and is pulled towards the stop 4. The gas in the back chamber 15 will subsequently bleed through the drain hole 35 and be released downstream 24 via the network of passageways 27, 23.

Figure 5:
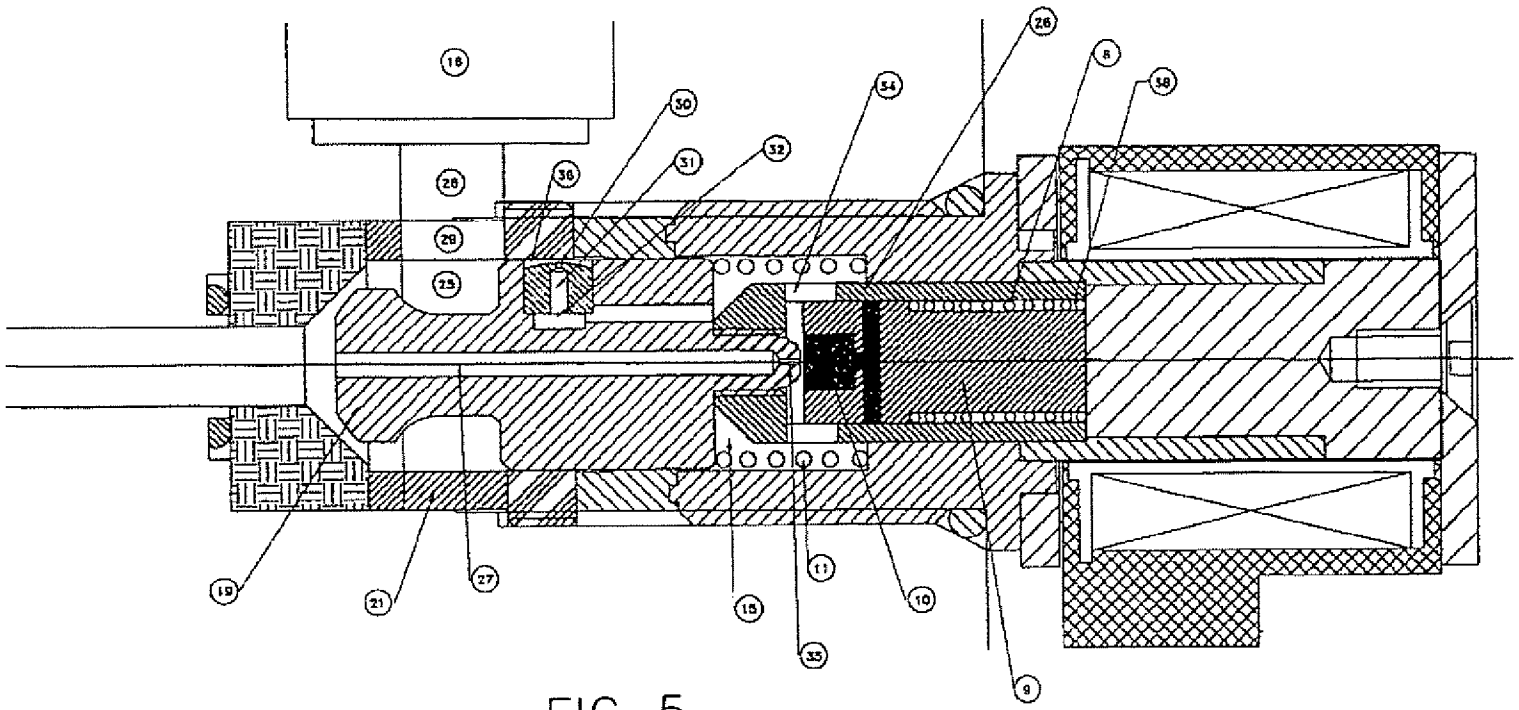
FIG. 5 is a view showing the inventive valve when a main piston is open.

Once the gas in the back chamber 15 is released downstream 24, the force resulting from the pressure difference between the front 25 and back chamber 15 becomes greater than the force of the return spring 11, which results in opening the main piston 19, as shown in FIG. 5. The guide bushing 26 is attracted by the magnetic force from the stop 4 and the pilot piston 9 is keeping open the drain orifice 35. The magnetic force between the stop 4 and the guide bushing 26 can avoid the abrupt shot-off of the main piston 19 in the event of abrupt change in the pressure difference between the front chamber 25 and the back chamber 15.

When the solenoid magnetic coil is no longer energized, the pilot piston seals against the drain orifice 35, allowing the pressure between the front 25 and back chamber 15 to equalize again as gas continues to flow into the back chamber 15 through the axial through hole 30. The main piston 19 is consequently forced by the return spring 11 to close against the seal 20, thus seizing the flow, and the valve returns to the condition shown in FIGS. 1, 2 and 3.

It will be understood that the elements described above may also be usefully applied in other types of constructions differing from the type described in detail above.

While the invention and description have been illustrated and embodied in a solenoid gas valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications.

What is claimed as new and desired to be protected by Letters Patent is set forth in the appended claims:

1. A solenoid gas valve construction comprising:

a main body defining an inlet, an outlet and a cavity communicating with both the inlet and outlet;

a tubular core comprising an inwardly directed annular flange and disposed in the cavity, a tube surrounding the core, a stop occluding the end of the tube, an o-ring mounted about the core and sealing the core to the main body;

a threaded nut, a spacer, a seal and a sleeve defining, in combination with the core, a main piston chamber;

a guide bushing having communication conduit holes locating circumferentially thereon, the guide bushing being in abutment at one end with the stop such that a pilot piston chamber is defined by the guide bushing, the core and the stop;

a main piston comprising an end, a recess portion, and a cylindrical body, the main piston being connected to the other end of said guide bushing and, together with said guide bushing, being slidably movable in said main piston chamber; said main piston segregating said main piston chamber to a front chamber and a back chamber, said main piston further having an axial passage including a drain orifice extending therethrough providing for communication between the pilot piston chamber and the outlet, the main piston further having a cavity located at an outer circumferential portion of the main piston to communicate with the front chamber and a passage connecting said cavity to said back chamber;

a pilot piston slidably movable in said pilot piston chamber;

an insert, having an axial through hole and disposed in said cavity, places into said cylindrical cavity of said main piston; the diameter of the axial through hole being smaller than that of said drain, the through-hole and passage defining a gas passage from said front chamber, to said back chamber;

a return spring received within said back chamber between said main piston and said inwardly-directed annular flange of said core, to urge said main piston in a direction away from said core, so that said spherical end of said main piston presses against said valve seat to close the communication between the inlet and outlet; and a pilot piston spring biasing to urge said pilot piston in a direction away from said stop of said core, so that the pilot piston presses against said drain orifice of said passage to achieve a gas-tight seal.

2. A solenoid gas valve as defined in claim 1 wherein the main body has a central axis, the inlet extends perpendicular to the central axis and the outlet extends along the central axis.

3. A solenoid gas valve as defined in claim 1 wherein the annular flange and stop are ferromagnetic and the tube is non-ferromagnetic.

4. A solenoid gas valve as defined in claim 1 wherein the spacer has circumferential openings to communicate between the inlet and the front chamber.

5. A solenoid gas valve as defined in claim 1 wherein the guide bushing is ferromagnetic.

6. A solenoid gas valve as defined in claim 1 wherein the surface of the end of the main piston is spherical and smooth and the cylindrical body of the main piston is spherical and smooth.

7. A solenoid gas valve as defined in claim 1 wherein said return spring is a compression spring.

8. A solenoid gas valve as defined in claim 1 wherein said pilot piston spring is a compression spring.

*9. A valve comprising:*

*a valve body having an inlet (16) and a downstream passageway (24) and a cavity communicating with each of the inlet and downstream passageway (24), the cavity including a front chamber (25) and a back chamber (15);*

*a solenoid coil (1);*

*a main piston (19) mounted for reciprocating movement in the valve body, the main piston having:*

*a passageway (27) terminating in an orifice (35);*

*being exposed to the front chamber (25) and the back chamber (15); and*

*a guide portion (26);*

*a pilot piston (9) constructed from ferromagnetic material and mounted for reciprocating movement in the guide portion (26);*

*a return spring (11) biasing the main piston (19) to a position which blocks flow between the inlet (16) and the downstream passageway (24);*

*a pilot piston spring (8) biasing the pilot piston (9) towards a position which blocks the orifice (35);*

*wherein the valve is adapted such that*

*when the coil (1) is energized, the pilot piston (9) is urged by the coil (1) away from the position which blocks the orifice, to allow gas from the back chamber (15) to bleed out of the valve through the orifice (35) and passageway (27);*

*when the main piston (19) is in the position which blocks flow between the inlet (16) and the downstream passageway (24) and the coil (1) is not energized, the front chamber (25) and back chamber (15) are in fluid communication with the inlet (16);*

*when gases in the back chamber (15) are bled from the valve via the orifice (35) and passageway (27), force resulting from the pressure difference between the front chamber (25) and back chamber (15) becomes greater than the force of the return spring (11), which results in the movement of the main piston (19) away from the position which blows flow between the inlet (16) and the downstream passageway (24), thereby allowing flow through the valve;*

*when the coil (1) is not energized, the pilot piston (9) seals against the orifice (35), allowing the pressure between the front chamber (25) and back chamber (15) to equalize, whereupon the main piston (19) is forced by the return spring (11) to the position which blocks flow through the valve.*

*10. A valve according to claim 9, wherein the guide portion (26) is ferromagnetic and, when the coil (1) is energized, is biased by the coil (1) away from the position which blows flow between the inlet (16) and the downstream passageway (24), thereby to avoid shut-off of the main piston in the event of an abrupt change in pressure.*

* * * * *